US008391880B2

(12) United States Patent
Aaron et al.

(10) Patent No.: US 8,391,880 B2
(45) Date of Patent: *Mar. 5, 2013

(54) BROAD QUALITY OF SERVICE OPTIMIZATION USING POLICY-BASED SELECTIVE QUALITY DEGRADATION

(75) Inventors: Jeffrey Aaron, Atlanta, GA (US); Robert Streijl, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/495,920

(22) Filed: Jun. 13, 2012

(65) Prior Publication Data

US 2012/0252427 A1 Oct. 4, 2012

Related U.S. Application Data

(63) Continuation of application No. 12/253,178, filed on Oct. 16, 2008.

(51) Int. Cl.
*H04W 72/00* (2009.01)

(52) U.S. Cl. .................... 455/452.2; 455/414.1

(58) Field of Classification Search .......... None
See application file for complete search history.

(56) References Cited

U.S. PATENT DOCUMENTS

| | | | |
|---|---|---|---|
| 6,272,545 B1 | 8/2001 | Flanagin et al. | |
| 6,553,232 B1 | 4/2003 | Shaffer et al. | |
| 6,826,150 B1 | 11/2004 | Bhattacharya et al. | |
| 6,947,750 B2 | 9/2005 | Kakani et al. | |
| 7,630,986 B1 | 12/2009 | Herz et al. | |
| 7,796,190 B2 | 9/2010 | Basso et al. | |
| 7,899,793 B2 | 3/2011 | Mimatsu | |
| 7,904,360 B2 | 3/2011 | Evans | |
| 7,969,990 B2 | 6/2011 | Shmueli et al. | |
| 7,975,062 B2 | 7/2011 | Krikorian et al. | |
| 8,006,290 B2 | 8/2011 | Agrawal et al. | |
| 8,185,489 B2 | 5/2012 | Aaron et al. | |
| 2003/0154242 A1 | 8/2003 | Hayes et al. | |
| 2004/0042489 A1 | 3/2004 | Messick et al. | |
| 2004/0253940 A1* | 12/2004 | Andrews et al. | 455/405 |
| 2005/0157660 A1 | 7/2005 | Mandato et al. | |
| 2006/0020646 A1 | 1/2006 | Tee et al. | |
| 2006/0025149 A1 | 2/2006 | Karaoguz et al. | |
| 2006/0092037 A1 | 5/2006 | Neogi et al. | |
| 2007/0050492 A1 | 3/2007 | Jorgensen | |
| 2007/0133428 A1 | 6/2007 | Taylor et al. | |
| 2007/0162966 A1 | 7/2007 | Agrawal et al. | |
| 2007/0198682 A1 | 8/2007 | Pazhyannur et al. | |
| 2007/0202923 A1 | 8/2007 | Jung et al. | |
| 2008/0008188 A1 | 1/2008 | Buga et al. | |
| 2008/0240444 A1 | 10/2008 | Shuster | |
| 2009/0005071 A1 | 1/2009 | Forstall et al. | |
| 2009/0177721 A1 | 7/2009 | Mimatsu | |
| 2009/0328087 A1 | 12/2009 | Higgins et al. | |
| 2010/0005483 A1 | 1/2010 | Rao | |
| 2010/0082567 A1 | 4/2010 | Rosenblatt et al. | |
| 2010/0099388 A1 | 4/2010 | Aaron et al. | |
| 2010/0099392 A1 | 4/2010 | Aaron et al. | |
| 2010/0100613 A1 | 4/2010 | Aaron et al. | |
| 2010/0100822 A1 | 4/2010 | Aaron et al. | |
| 2010/0146527 A1 | 6/2010 | Craib et al. | |

* cited by examiner

*Primary Examiner* — Rafael Pérez-Gutiérrez
*Assistant Examiner* — German Viana Di Prisco
(74) *Attorney, Agent, or Firm* — Woodcock Washburn LLP

(57) ABSTRACT

Devices, methods and computer-readable media for providing broad quality of service optimization using policy-based selective quality degradation. Data associated with a quality of service for customers and QoS policy rules are stored. Customers are grouped for potential degradation. Levels of degradation are defined for each type of user device. Degradation for the group of customers is optimized using policy rules. Degradation is adjusted to account for variations in user treatment within the group. The adjusted degradation is then implemented.

18 Claims, 4 Drawing Sheets

BROAD QUALITY OF SERVICE OPTIMIZATION USING POLICY-BASED SELECTIVE QUALITY DEGRADATION

CROSS-REFERENCE TO RELATED APPLICATIONS

This application is a continuation of, and claims priority to, U.S. patent application Ser. No. 12/253,178, entitled "Devices, Methods, And Computer-Readable Media For Providing Broad Quality Of Service Optimization Using Policy-Based Selective Quality Degradation," filed Oct. 16, 2008, which is hereby incorporated herein by reference in its entirety:

This application is related to the following co-pending and commonly-assigned patent applications, which are hereby incorporated herein by reference in its respective entirety:

"Devices, Methods, And Computer-Readable Media For Providing Control Of Switching Between Media Presentation Screens" to Jeffrey Aaron et al., having Ser. No. 12/253,003;

"Devices, Methods, And Computer-Readable Media For Providing Calendar-Based Communication System Services" to Jeffrey Aaron et al., having Ser. No. 12/253,137;

"Devices, Methods, And Computer-Readable Media For Providing Services Based Upon Identification Of Decision Makers And Owners Associated With Communication Services" to Jeffrey Aaron et al., having Ser. No. 12/253,157; and "Devices, Methods, And Computer-Readable Media For Providing Quality Of Service Optimization Via Policy-Based Rearrangements" to Jeffrey Aaron et al., having Ser. No. 12/253,197.

BACKGROUND

Embodiments herein relate to systems, methods, and computer-readable media for providing services based upon adjustment of quality of service. More particularly, the embodiments relate to devices, methods and computer-readable media for providing broad quality of service optimization using policy-based selective quality degradation.

Wireless cell phone technology offers the convenience of keeping in contact with others at any place and at any time. Cell phones may connect wirelessly with a cell phone network to offer data and communication services. Cell phones often combine communication, digital photography, video game functions, video and audio-video viewing functions, etc. To take advantage of this added functionality, hybrid cell phones that combine short-range (WiFi), high-speed Internet access and cellular service have been marketed to allow users to make connections using a local wireless Internet access point and seamlessly switch over to a cell phone network whenever necessary. Moreover, cellular carriers have spent billions of dollars to upgrade their systems for high-speed data. The upgraded networks offer wide coverage that exceeds WiFi's short range.

The computing power and the functionality now present on mobile devices enables many new services and functions to be provided to communication system customers. In addition, such new services and functions present opportunities for new revenue streams for system carriers. By providing the new services and functions, the carriers are able to develop long-term relationships with both residential and corporate subscribers.

Control of applications, services and networks associated with a communication system can be achieved using a policy architecture. A policy architecture may include a rules engine plus enforcement points in applications and throughout the network. Accordingly, wireless systems are being built upon the promise of delivering new and different types of high-speed multimedia services. In this way, service providers can extend their offerings beyond basic network services to include also value-added services and specialized application services. The service management concept involves the ability to create, supervise, update and remove services on a networking platform so that service providers can deliver the new services adapted to the customer requirements and experiences, meeting the customer demand while fulfilling customer expectations.

Many important new applications and services are quality sensitive. Current QoS (Quality of Service) approaches treat users individually. However, when multiple users share a specific limiting resource, e.g., a shared network connection and/or bandwidth, one user's quality enhancement or preservation may result in another user's quality degradation. This is aggravated by available resources changing due to many various factors.

It is with respect to these and other considerations that the embodiments described herein have been made.

SUMMARY OF THE INVENTION

According to exemplary embodiments, methods, computer-readable media, and devices provide a broad quality of service optimization using policy-based selective quality degradation.

According to one embodiment, data associated with a quality of service for customers and quality of service policy rules are stored. Customers are grouped for potential degradation. Levels of degradation are defined for each type of user device. Degradation for the group of customers is optimized using policy rules. Degradation is adjusted to account for variations in user treatment within the group. The adjusted degradation is then implemented.

These and other features and advantages, which characterize the embodiments, will be apparent from a reading of the following detailed description and a review of the associated drawings. It is to be understood that both foregoing general description and the following detailed description are exemplary and explanatory only and are not restrictive of the invention, as claimed.

DETAILED DESCRIPTION

In the following description of the embodiments, reference is made to the accompanying drawings that form a part hereof, and in which is shown by way of illustration the specific embodiments in which the invention may be practiced. It is to be understood that other embodiments may be equally applicable to providing broad quality of service optimization using policy-based selective quality degradation.

Figure 1:
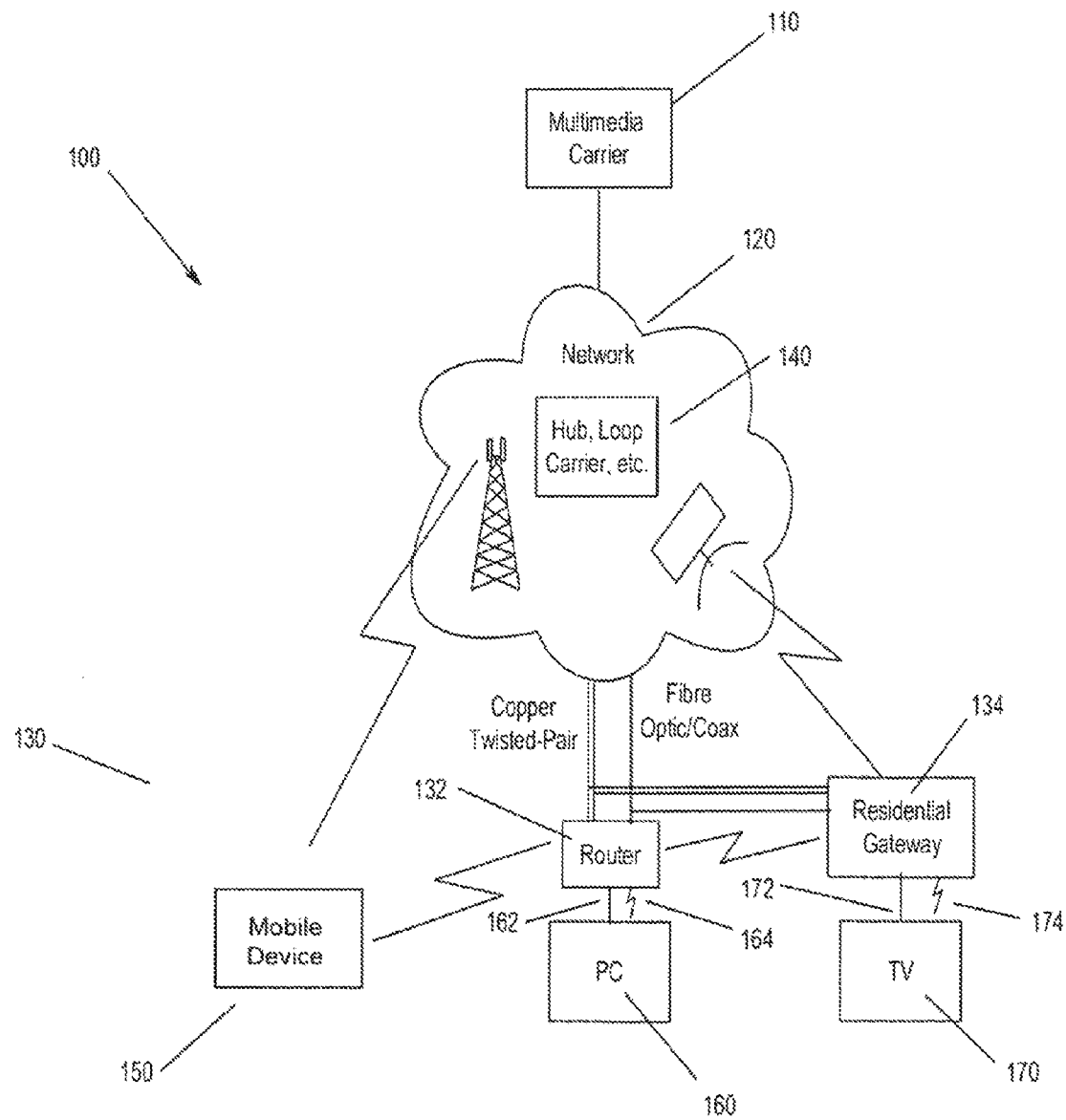
FIG. 1 illustrates a general block diagram of a media and communication network according to an exemplary embodiment.

FIG. 1 illustrates a general block diagram 100 of a media and communication network according to an exemplary embodiment. A multimedia carrier 110 is configured to provide hardware and software infrastructure for the delivery of content and for providing communication channels for subscribers or other users. Examples of communication channels include telephone services, Internet access, voice-over-IP, interactive television and gaming, etc. The multimedia carrier 110 acquires programming from content providers and encodes the content. The multimedia carrier 110 may also add local programming and provide additional digital services such as video on demand, and storage for content according to user directions.

The multimedia carrier 110 is coupled to a network 120 for distributing the content, providing Internet access, telephone services, etc. The network 120 provides the intermediate infrastructure between the point-of-delivery 130 and the multimedia carrier 110. The network 120 may be configured to provide one or more or the intermediate infrastructure 140 for television content delivery, plain-old-telephone system, satellite television, Internet services, wireless communications, such as cellular mobile phone services, etc. Accordingly, the network may include hub offices, IP service offices, local loop carrier facilities, satellite carrier facilities, communication satellites, telecom point-of-presence, mobile switching centers, base stations, and distribution nodes.

At the point-of-delivery 130, a router 132 may be used to provide digital services, such as Internet access. A computer or other Internet-capable device 160 may be coupled to the router 132 by a network cable 162 or wirelessly 164. A residential gateway 134 may be used to provide content, e.g., IPTV, to multimedia-capable viewing devices, such as a television, via a cable 172 or wirelessly 174. A mobile device 150 operates within a mobile operating system. Examples of such mobile devices 150 may include cell phones, smart phones, handheld computers, personal digital assistants, etc.

In addition, mobile devices 150 may be configured to use location-based services (LBS) to receive information specific to a location. Some examples of location-based services include requesting the nearest business or service, such as an ATM or restaurant, and finding a friend. A service provider may obtain the location of a mobile device from a global positioning system (GPS) circuit built into the device, or by using radiolocation and triangulation based on the signal-strength of the closest cell-phone towers (for phones without GPS features). Any other suitable means of obtaining or estimating location may also be used.

Figure 2:
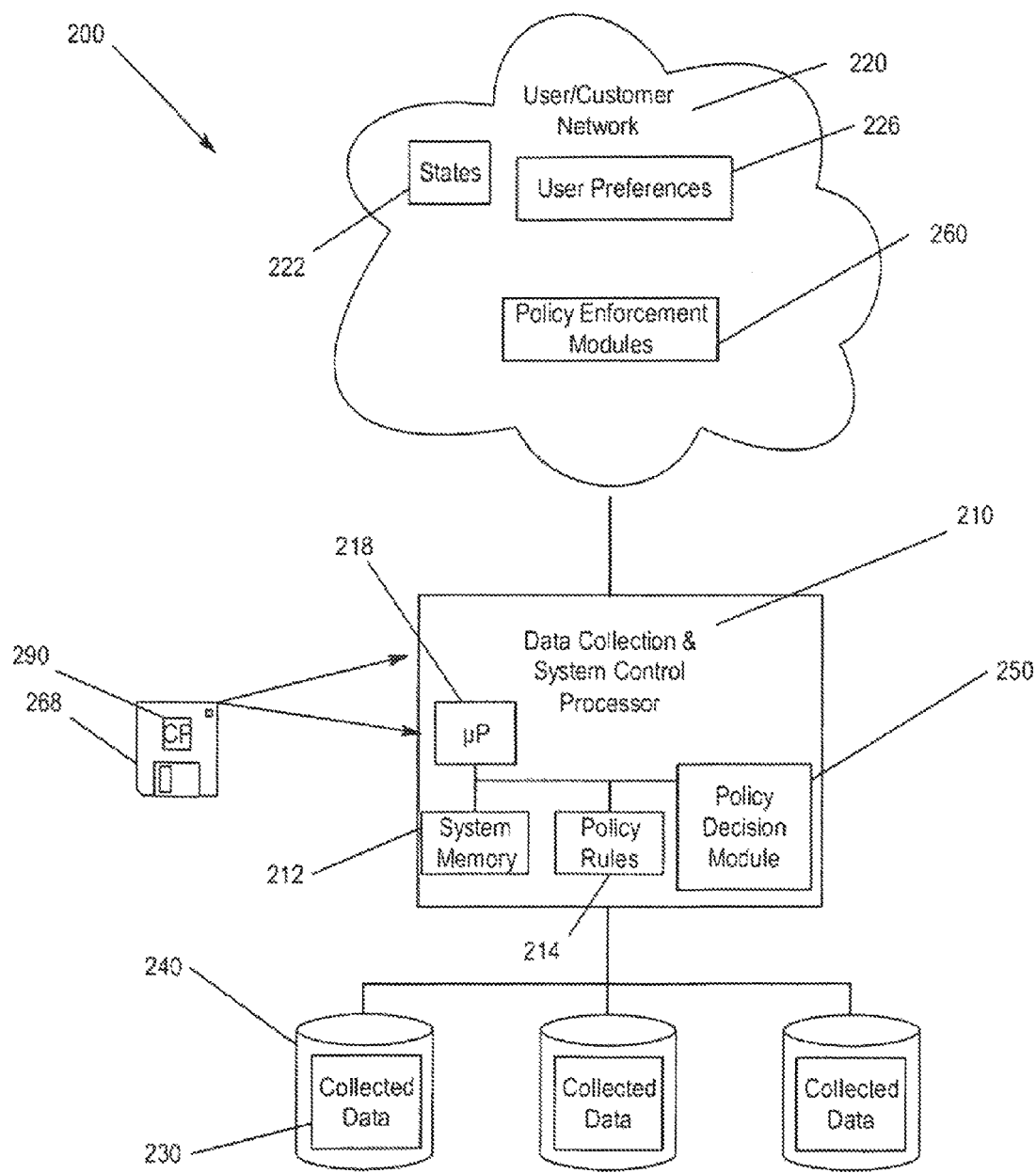
FIG. 2 illustrates a system for providing broad quality of service optimization using policy-based selective quality degradation.

FIG. 2 illustrates a system 200 for providing broad quality of service optimization using policy-based selective quality degradation according to an exemplary embodiment. Policy rules engine plus enforcement points in applications enables a service provider to adjust the quality of service for different uses to meet the demand of other users.

As shown in FIG. 2, a data collection and system control processor 210 includes a policy decision module 250 that makes decisions based on the collected data 230. Based upon the collected data 230, the data collection and system control processor 210 may identify different system states 222, such as the state of the network, various states of network-related equipment such as routers and firewalls, various states of service-related equipment such servers, the state of a service provided to a user, even the state of a customer, or other more fine-grained managed object states. The data collection and system control processor 210 may also identify functions, services, event suggestions, etc. that may be of interest to a customer. Inferences regarding what users like, need, and would be inclined to prefer can also be obtained. The policy decision module 250 uses the collected data 230 to adjust the quality of service for different uses to meet the demand of other users.

The data collection and system control processor 210 gathers information from across the network of users 220. The data collection and system control processor 210 also obtains the user preferences 226 and builds profiles on users based on the activities of the users. The data collection and system control processor 210 collects and controls the system based upon collected data 230. The data collection and system control processor 210 includes memory 212, policy rules 214, a policy decision module 250 and a processor 218. The processor 218 controls the functions, analysis and manipulation of collected data 230 and applies policy rules 214. The processor 218 uses the policy rules 214 and the collected data 230 to identify suggestions or network changes to make adjustments in the quality of service for different users. To accomplish the operations of embodiments, the policy enforcement functions 260 may be used to activate or implement the identified services or functions as discussed herein.

The data collection and system control processor 210 groups customers, defines several levels of degradation, and uses rules to decide how degrade quality within the group so that a premium quality user can be properly accommodated. The data may include responses obtained by querying the customer. However, this is usually a mode of last resort. Each type of device may be set at one of several different levels. For example, level high may be the maximum device resolution, level medium may be somewhat reduced from maximum device resolution, e.g., 20% reduced, and level low may represent a resolution reduced to the point of being generally irritating, e.g., 35%, level bad may be a resolution that is very reduced and very unsatisfying normally, but at least still legible, e.g., 50% and level cut-off, e.g., 100%. Percent reductions could be further adjusted by application, customer profile group, preferences, etc.

Using the policy rules 214, the policy decision module 250 may automatically determine or infer whether each customer or service user in the group would accept a degradation, and by how much. This could be done via a combination of preference-setting by the customer, profiling, and inference via usage history. But, if it is necessary to ask, e.g. because an automatic determination is not achieved, the customer may be queried whether a reduction is acceptable, and how much degradation the customer may accept. Such a query may be achieved using the customer's preferred mode of inquiry and alternative presentation, e.g., alternative scope, rule-base black list, rule-based white list. The policy decision module 250 may also automatically ask members of the customer's group, e.g., family, business colleagues, etc., based on preferences, rules, and contact order. When a customer does not reply, the process may roll to the next person in the group.

By applying the rules 214, the policy decision module 250 may implement selective degradation of an individuals' service quality to achieve optimal overall service quality for a group. For example, if the system 200 takes away from ten people just 5% of their quality, resources are then available to serve one additional person who is important based upon the fact that the user is paying a premium. The policy decision module 250 provides input to the processor 218 to allow automatic setting and adjustment of potential degradation levels, such as quality reduction, depending on application, service, user, device, and group. The policy decision module 250 also provides input to the processor 218 to allow automatic inference of the degree of degradation acceptable to each user. As a last resort, the policy decision module 250 may select an appropriate method to inquire of one or more users relevant to the affected users and the group. The policy rules 214 can help ensure quality overall for a group of resource-sharing users. Policy rules can be used by the policy decision module 250 to make the many decisions required to form alternatives, select users to degrade or not, determine how much degradation can be applied to each user, etc. so as to obtain the proper degradation. The need to degrade quality, as described herein, may be triggered by a previously idle user, especially a premium quality user, that now wants to use a service or application but available resources are limited such that, if this user is allowed to continue, users can no longer be comfortably served with the quality they need or desire. This situation is especially troublesome when the user wants to sue a QoS-sensitive service or application. The need to degrade quality may also be triggered by various factors, wherein the available resources change such that users can no longer be comfortably served with the quality they need or desire. Another triggering event occurs when the continuing usage of services and or applications causes consumption of resources to grow beyond a comfortable threshold such that users can no longer be comfortably served with the quality they need or desire.

The processor 218 and policy decision module 250 prioritize degradation using policy rules 214. The policy rules 214 define an appropriate ordering of whom to degrade first, second, etc. Inputs to the policy rules 214 include the types and/or models of end user devices, the applications being used by each user in the group, the amount of degradation determined based on profiles, service and exception handling. The processor 218 detects errors, such as user irritation or a trigger to stop, and may revert to the last working situation.

In addition to bandwidth, there are many other kinds of resources like, such the numbers of labels, the number of IDs, the frequencies or time slots being used, CMA codes, etc. To prevent from irritating a customer, the system 200 must have access to knowledge concerning the customers. Thus, the profile information is part of the data 230 for each customer is collected and plays an important role. Other information concerning customers may be provided by GPS phones, whether the customer is logged in to a network, the history of use of a customer, etc. By applying the policy rules 214, the policy decision module 250 may plan for degrading one user if a need arises to move or degrade that user to get some quality to another user. As mentioned above, it may be necessary to take away quality from multiple users at different levels of degradation to meet the overall demand. The policy decision module 250 may take into account the relevance of the usage to the user and to each of the other user so a user is not degraded past the point of being irritated.

Deep packet inspection (DPI) may be used to look into the data that is moving across the network to find out exactly what type of data is moving across the network and what shows are being watched, what game is being played, etc. Further, the rules 214 may be applied to decide exactly how much more resources is required by a user. For example, does the user want the additional resources, but is it particularly relevant to them from their profile.

FIG. 2 shows only one embodiment. However, embodiments may take the form of an entirely software embodiment or an embodiment containing both hardware and software elements. Embodiments may be implemented in software that includes, but is not limited to, firmware, resident software, microcode, etc. Furthermore, other embodiments may take the form of a computer program product 290 accessible from a computer-usable or computer-readable medium 268 providing program code for use by or in connection with a computer or any instruction execution system.

For the purposes of this description, a computer-usable or computer readable medium 268 can be any apparatus that can contain, store, communicate, propagate, or transport the program for use by or in connection with the instruction execution system, apparatus, or device. The medium 268 may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A system suitable for storing and/or executing program code for providing data collection and system control according to an exemplary embodiment may include at least one processor 210 coupled directly or indirectly to memory elements 212. The memory elements 212 can include local memory employed during actual execution of the program code, bulk storage, and cache memories which provide temporary storage of at least some program code in order to reduce the number of times code must be retrieved from bulk storage during execution.

Accordingly, the computer program 290 comprise instructions which, when read and executed by the system 200 of FIG. 2, causes the system 200 to perform the steps necessary to execute the steps or elements of embodiments. Moreover, the functionality associated with the processor 218 for providing data collection and system control 210 may be centralized or partially to fully distributed and included in any piece of equipment or any portion of software in the system 200. Accordingly, the data collection and control framework may be distributed across the system 200. Further, the data collection and control 210 may be configured as an overlay over the system infrastructure to offer the services, functions and suggestions discussed above.

Figure 3:
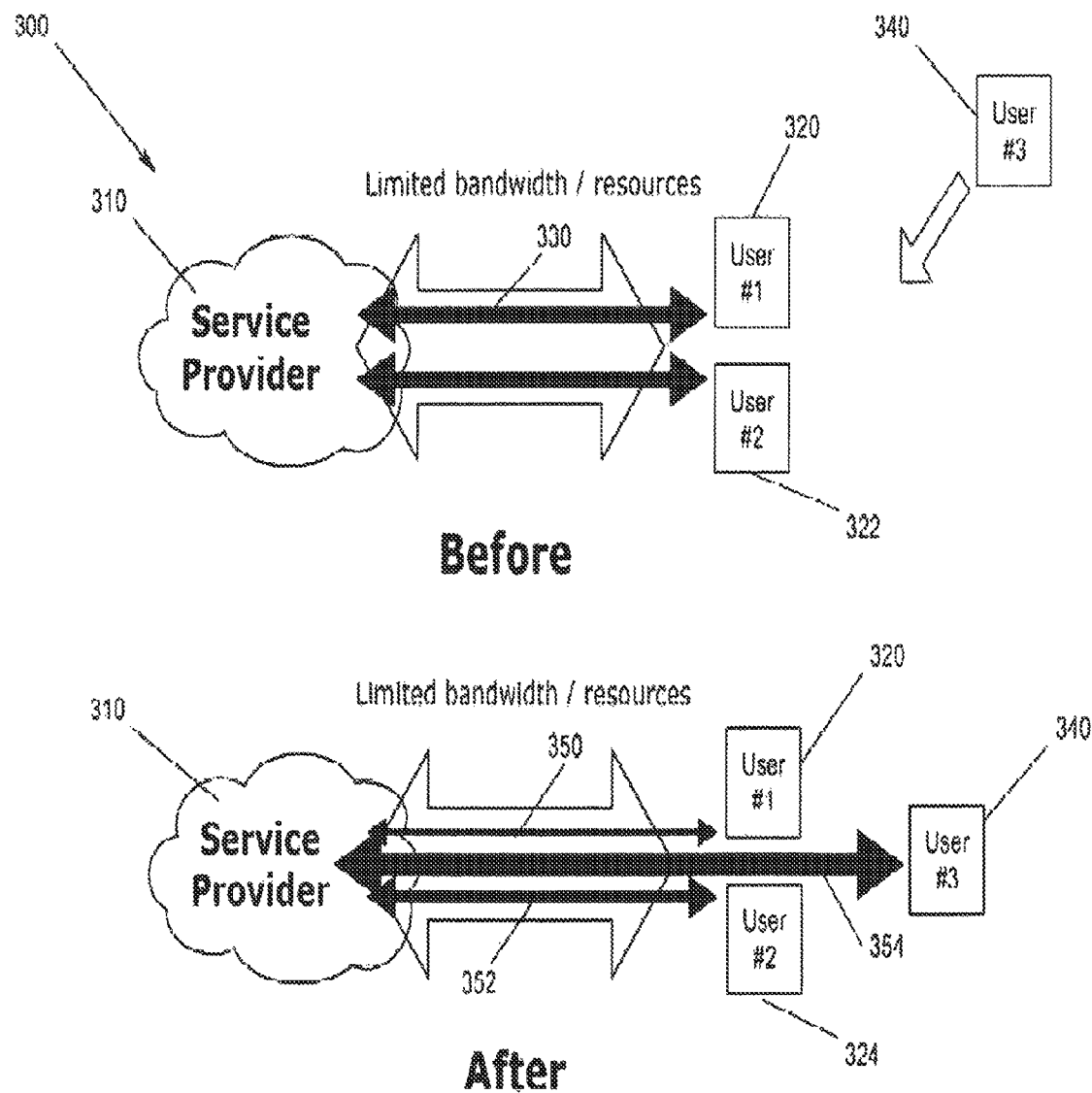
FIG. 3 illustrates a method for applying select quality degradation to meet customer demands according to an exemplary embodiment.

FIG. 3 illustrates a method 300 for providing processor controlled application of select quality degradation to meet customer demands according to an exemplary embodiment. Initially, a service provider 310 is servicing two users or customers 320, 322. The quality of service for each user is represented by the thickness of the arrows 330. The service provider 310 is capable of providing only limited bandwidth and resources. A third user 340, however, wants to access resources of the service provider 310. In fact, the third user 340 wants to have access to a greater amount of resources than either of the two other users 320, 322. To meet the demands of the third user 340, quality for the two other users 320, 322 can be degraded according to user profiles and in an order determined via policy rules.

As shown in FIG. 3, the third user 340 is provided the level of resources desired by the third user. The quality of service for the first user 320 is greatly decreased as shown by the thinner arrow 350. The quality of service for the second user 322 is only slightly decreased as shown by the slightly thinner arrow 352. However, each level of quality of service for the two users 320, 322 is still acceptable according to the profiles and preferences of the two users 320, 322. Thus, the quality of service provided to the third user 340 can be made sufficient to match the premium service settings of the third user 340 as shown by the wide arrow 354.

Figure 4:
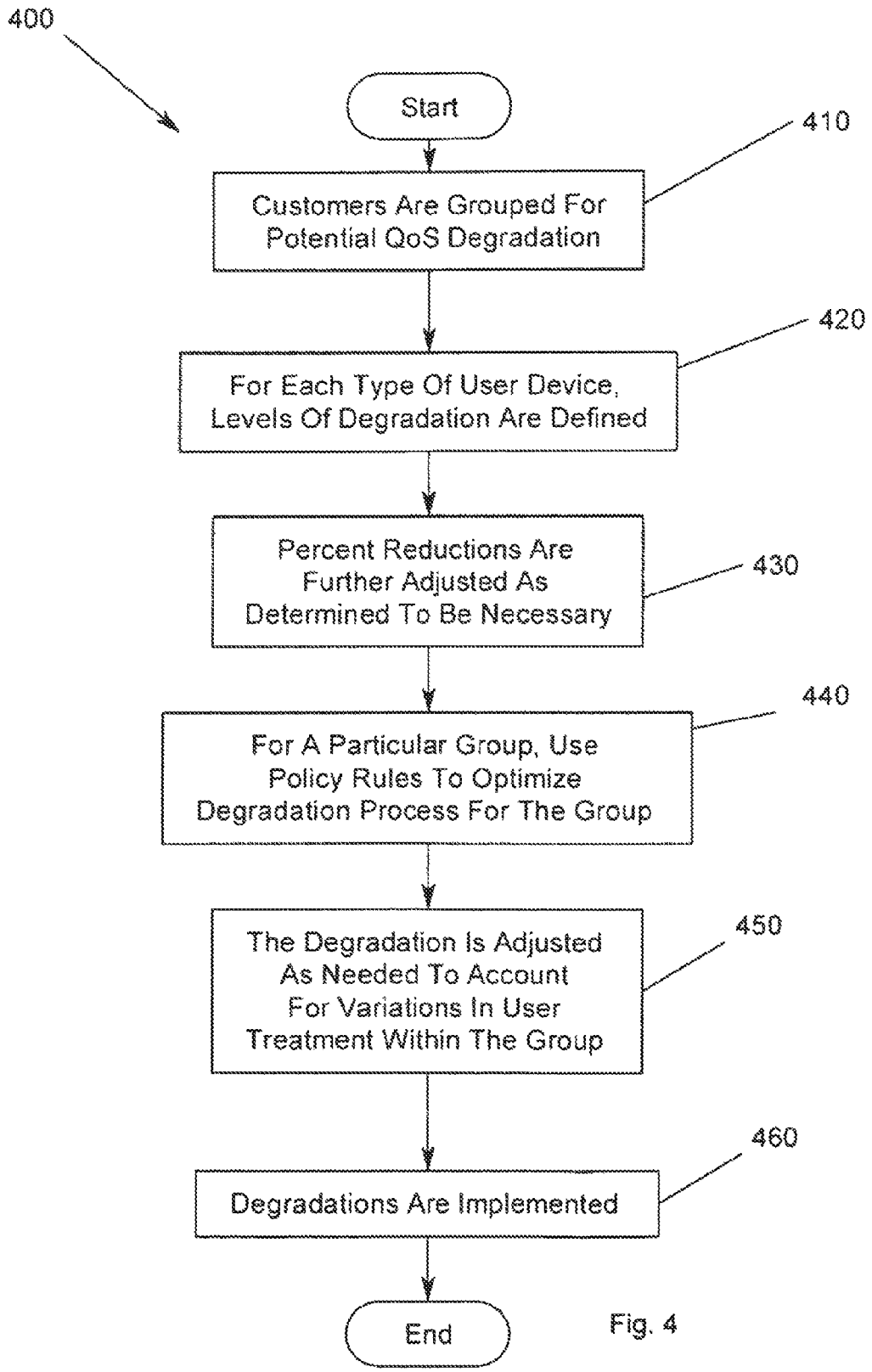
FIG. 4 is a flow chart of a method for providing broad quality of service optimization using policy-based selective quality degradation according to an exemplary embodiment.

FIG. 4 is a flow chart 400 of a processor controlled method for providing a broad quality of service optimization using policy-based selective quality degradation according to an embodiment. In FIG. 4, customers are grouped for potential degradation 410. Such grouping may include members of a household, workers at a business location, etc. A group may be defined as users that, for whatever reason, share a specific quality-limiting resource, e.g., network bandwidth and/or connection. For each type of user device, levels of degradation are defined 420. For example, level high may be the maximum device resolution or a range from 90% to maximum device resolution, level medium may be somewhat reduced from maximum device resolution, e.g., 20% reduced, and level low may represent a resolution reduced to the point of being generally irritating, e.g., 35% reduced, level bad may be a resolution that is very reduced and very unsatisfying normally, but at least still legible, e.g., 50% and level cut-off, e.g., 100%.

Percent reductions could be further adjusted 430 by application or service, the mix of the application and service, the customer profile or group profile, the customer preferences, etc.

For a particular group, policy rules are used to optimize degradation process for the group 440. The order of degradations is determined, whether each customer in the group would accept a degradation, and by how much is determined or inferred. For instance, a combination of preference-setting by the customer, profiling, and inference via usage history may be used to set the order of degradations. The changes and/or individual effects, both positive for enhancement or preservation, and negative for degradations, are rated. The tentative best optimized result is selected and changes for each user are combined via a cumulative rating approach.

The degradation is adjusted as needed to account for variations in user treatment within the group 450, i.e., various user profiles. Some users may be premium users, e.g., paying for relatively better service or specific treatment. Further, some user may be higher priority, for other reasons, e.g., the president of a company. Still further, some users may be using Quality of Service-sensitive applications or services, requiring relatively more resources. Then, the degradations are implemented 460. For example, the degradations may be implemented through a distributed policy architecture including policy enforcement points, etc.

As a last resort only, i.e., only if suitable results cannot be obtained automatically, the customer is queried. Other users related to the customer, e.g., who may be suitably authorized, may also be queried. The customer may be asked whether a reduction is acceptable, and how much. The query is presented to a user through the user's preferred mode of inquiry.

Accordingly, devices, methods and computer-readable media provide broad quality of service optimization using policy-based selective quality degradation. By applying policy rules, selective degradation of an individuals' service quality may be implemented to achieve optimal overall service quality for a group. The degree of degradation acceptable to each user is determined to achieve the level of degradation for some customers without causing an unacceptable level of degradation.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A device comprising:
    memory for storing data associated with a quality of service and for storing quality of service policy rules; and
    a controller, coupled to the memory, the controller configured to:
        define levels of degradation for each type of device in a group based on a shared quality limiting resource;
        optimize degradation of a quality of service provided to the group based on policy rules governing levels of degradation for each type of device;
        determine an order for selective degradation quality of service of individual devices in the group of devices; and
        conforming to the optimized degradation, selectively degrade quality of service of individual devices in the group of devices.

2. The device of claim 1, wherein the controller groups devices by grouping all members of a household that use the service.

3. The device of claim 1, wherein the controller groups devices by grouping all workers at a business location that use the service.

4. The device of claim 1, wherein the controller adjusts a degradation of quality of service based upon at least one of an application, a service, a customer profile, a group profile, or customer preferences.

5. The device of claim 1, wherein the memory stores information regarding levels of degradation that are based upon a percentage of a maximum device resolution.

6. The device of claim 1, wherein the controller adjusts degradation by determining an order of degradations, determining acceptability of a degradation, and determining acceptability of an amount of degradation.

7. The device of claim 1, wherein the controller adjusts degradation using a preference setting, a user profile, and inferences derived from usage history.

8. The device of claim 1, wherein the controller provides a query when acceptable results are not obtained automatically.

9. A tangible computer-readable storage medium having executable instructions stored thereon that, when executed, cause a computer to perform operations comprising:
    defining levels of degradation for each type of device in a group based on a shared quality limiting resource;
    optimizing degradation of a quality of service provided to the group based on policy rules governing levels of degradation for each type of device;
    determining an order for selective degradation quality of service of individual devices in the group of devices; and
    conforming to the optimized degradation, selectively degrading quality of service of individual devices in the group of devices.

10. The computer-readable storage medium of claim 9, wherein the forming a group of devices further comprises grouping all members of a household that use the service.

11. The computer-readable storage medium of claim 9, wherein the forming a group of devices further comprises grouping all workers at a business location that use the service.

12. The computer-readable storage medium of claim 9, the operations further comprise at least one of adjusting a degradation of quality of service based upon applications, adjusting a degradation of quality of service for services provided by a service provider, adjusting a degradation of quality of service based upon a mix of applications and services, adjusting a degradation of quality of service based upon a customer profile, adjusting a degradation of quality of service based upon a group profile, or adjusting a degradation of quality of service based upon customer preferences.

13. The computer-readable storage medium of claim 9, the operations further including storing information regarding levels of degradation that are based upon a percentage of a maximum device resolution.

14. The computer-readable storage medium of claim 9, the operations further comprising adjusting degradation by determining an order of degradations, determining acceptability of a degradation, and determining acceptability of an amount of degradation.

15. The computer-readable storage medium of claim 9, the operations further comprising adjusting degradation using preference setting by a customer, profiling of the customer, and inferences derived from usage history of a customer.

16. The computer-readable storage medium of claim 9, the operations further including providing a query when acceptable results are not obtained automatically.

17. A method comprising:
defining levels of degradation for each type of device in a group based on a shared quality limiting resource;
optimizing degradation of a quality of service provided to the group based on policy rules governing levels of degradation for each type of device;
determining an order for selective degradation quality of service of individual devices in the group of devices; and
conforming to the optimized degradation, selectively degrading quality of service of individual devices in the group of devices.

18. The method of claim 17, wherein the degradation of the service is based upon at least one of applications, profiles, identified preferences, degradation sensitivity, or inferences derived from usage history.

* * * * *